(No Model.)
A. T. RAPKIN & F. COSSOR.
INDICATING THERMOMETER.
No. 483,365. Patented Sept. 27, 1892.
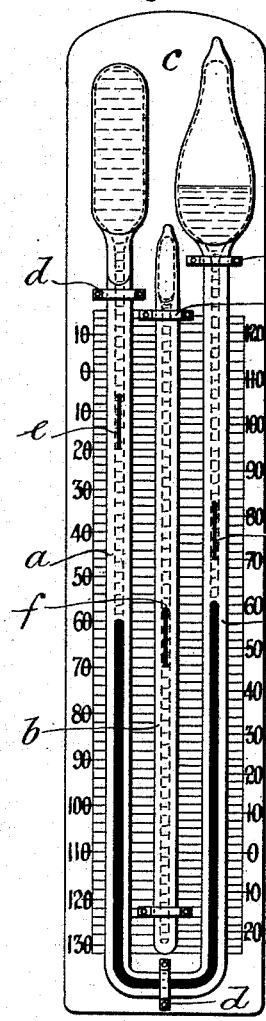
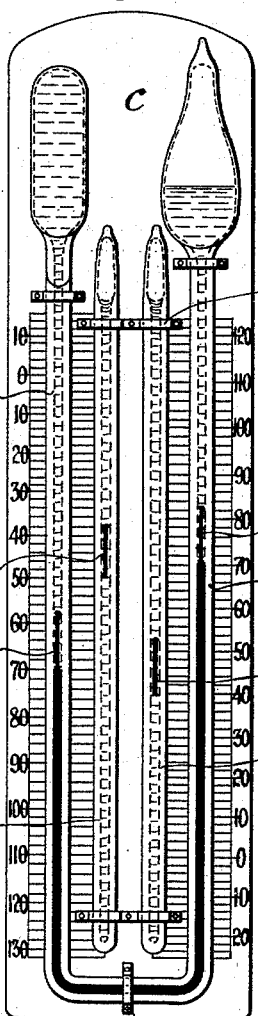
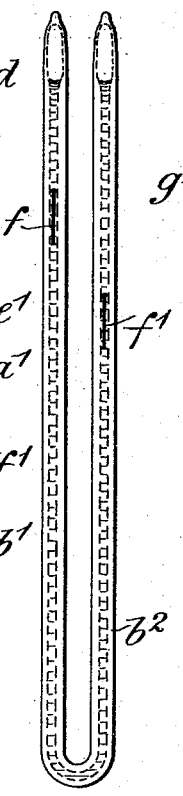
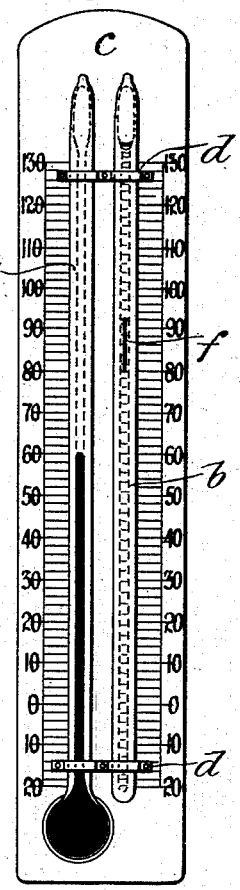
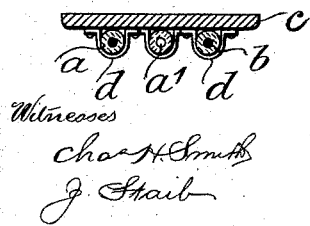
Witnesses
Chas H Smith
J. Staib
Inventors
Alfred T. Rapkin
Frank Cossor
per Lemuel W. Serrell
Atty

UNITED STATES PATENT OFFICE.

ALFRED THOMAS RAPKIN AND FRANK COSSOR, OF LONDON, ENGLAND; SAID COSSOR ASSIGNOR TO SAID RAPKIN.

INDICATING-THERMOMETER.

SPECIFICATION forming part of Letters Patent No. 483,365, dated September 27, 1892.

Application filed February 11, 1892. Serial No. 421,088. (No model.)

*To all whom it may concern:*

Be it known that we, ALFRED THOMAS RAPKIN and FRANK COSSOR, subjects of the Queen of Great Britain and Ireland, residing at London, England, have invented certain new and useful Improvements in Thermometers, of which the following is a specification.

This invention relates to improvements in thermometers, and has for its object to enable one reading to be readily compared with another or the mean or maximum temperature of one day to be compared with that of another.

In carrying out our invention and according to one arrangement we provide the thermometer with an additional independent tube that is parallel with and adjacent to the thermometer-tube and which we term an "indicating-tube," which is sealed at both ends and contains any suitable liquid. Within such indicating-tube we place a movable indicator, which is advantageously composed of some magnetic substance, such as steel, so as to be capable of being moved up or down by means of a magnet applied from the outside. The indicating-tube is provided with a scale whose divisions are arranged to correspond with those of the thermometer-scale. By shifting the movable indicator up or down within the indicating-tube said indicator can be brought to coincide with the level of the mercury or the liquid of a thermometer or with the level of the indicator of an indicating-thermometer, which indicator can then be shifted into position for taking a fresh reading. When the next reading is taken, the difference between the temperature indicated by the indicator and that indicated by the level of the mercury or the liquid or of the thermometer-indicator can be quickly read off, and the difference in temperature between the two readings be thus readily ascertained.

If desired, we may employ several indicating-tubes instead of one, so that a table of the differences in temperature existing between several days can be kept and be compared.

The accompanying drawings illustrate various applications of our invention.

Figure 1 shows a Six's self-indicating minimum and maximum thermometer provided with a single indicating-tube, and Fig. 2 is a cross-section thereof. Fig. 3 also shows a Six's thermometer, but provided with two indicating-tubes. Fig. 4 shows a bent indicating-tube which may be used in place of the two indicating-tubes shown in Fig. 3. Fig. 5 shows an ordinary thermometer provided with a single indicating-tube.

In all the figures like letters indicate similar parts.

Referring more particularly to Fig. 1, $a\ a'$ are the two limbs of the thermometer-tube, between which the independent and parallel indicating-tube $b$ is situated, these tubes being retained in place upon the plate $c$ by means of clips $d$ or in any other suitable manner. $e\ e'$ are the minimum and maximum indicators, respectively, and $f$ is the indicator of the tube $b$. The plate $c$ is provided with the ordinary Fahrenheit or other scale, the divisions thereof being prolonged, so as to enable the scale to be conveniently read off from either the thermometer-tube or the indicator-tube. In this figure the minimum-indicator $e$ is at "20°," while the indicator $f$, which was set when the previous reading was taken to the temperature then indicated by the minimum indicator $e$, is at "70°." By comparing these two readings the difference in the minimum temperature existing between, say, two days, is easily ascertained. In this instance it would be 70° − 20° = 50°.

In the arrangement shown by Fig. 3 the limbs of the thermometer-tube are formed wider apart, so as to permit of two independent and parallel indicating-tubes $b\ b'$ or the bent independent indicating-tube $b^2$, Fig. 4, being situated between said limbs, and thus enable both the maximum and minimum temperatures to be compared. This figure shows the thermometer-indicators $e$ and $e'$ shifted into position for taking a fresh reading, while the indicators $f$ and $f'$ are shown in the positions to which they have been set to show the previous maximum and minimum readings.

When the independent and parallel indicating-tube is applied to an ordinary thermometer, as shown at Fig. 5, the difference in temperature existing at certain fixed times can be compared. Thus if the temperature indicated by the mercury or the liquid in the thermometer-tube $g$ at, say, two o'clock p. m. be "60°" and the same be shown by means of the indicating-index we can by taking a fresh reading at, say, six o'clock p. m. readily ascertain the difference in temperature between the two readings.

Instead of arranging the independent and parallel indicating-tubes between the limbs of the thermometer-tube, as shown in the drawings, we can, if required, arrange the indicating-tubes on each side of the thermometer-tube.

We do not claim an indicating device in a glass tube and moved by the changes of temperature and set by a magnet. Neither do we claim an indicating device combined with a thermometer and capable of being set by hand. This, however, is liable to be moved accidentally or designedly.

We claim as our invention—

1. The combination, with a thermometer, of an adjacent parallel and independent glass tube having an indicator therein that is not influenced by the changes of temperature, but is set in either direction by a magnet, substantially as specified.

2. The combination, with a thermometer having indicators that are moved by changes of temperature, of an adjacent parallel and independent glass tube having an indicator therein that is not influenced by the changes of temperature, but is set in either direction by a magnet, substantially as specified.

3. The combination, with a thermometer, of an adjacent parallel and independent glass tube having an indicator therein that is not influenced by the changes of temperature, but is set in either direction by a magnet, and a scale the divisions of which are common to both the thermometer-tube and the independent indicating-tube, substantially as specified.

4. The combination, with an indicating-thermometer having two connected parallel limbs $a$ $a'$ and having indicators that are moved by changes of temperature, of an independent glass tube between the said limbs and adjacent and parallel thereto and having an indicator therein that is not influenced by changes of temperature, but is set in either direction by a magnet, and a scale the divisions of which are common to both the thermometer-tube and the independent indicating-tube, substantially as specified.

In witness whereof we have hereunto signed our names in the presence of two subscribing witnesses.

ALFRED THOMAS RAPKIN.
FRANK COSSOR.

Witnesses:
H. ASHBY NORRIS,
  78 *Fleet Street, London.*
JOSEPH LAKE,
  17 *Gracechurch Street, London, E. C.*